United States Patent
Nakata et al.

[15] 3,649,880
[45] Mar. 14, 1972

[54] SOLID ELECTROLYTIC CAPACITOR HAVING A TITANIUM-ZIRCONIUM ALLOY ELECTRODE

[72] Inventors: Koreaki Nakata, Hyogo-ken; Yoshio Iida, Osaka, both of Japan

[22] Filed: Sept. 16, 1970

[21] Appl. No.: 72,824

Related U.S. Application Data

[63] Continuation of Ser. No. 704,057, Feb., 1968, abandoned.

[30] Foreign Application Priority Data

Apr. 21, 1967    Japan..................................42/25937
July 19, 1967    Japan..................................42/46934

[52] U.S. Cl..............................................317/230, 29/570
[51] Int. Cl. ..........................................................H01g 9/05
[58] Field of Search ..........................317/230, 231, 232, 233

[56] References Cited

UNITED STATES PATENTS

| | | | |
|---|---|---|---|
| 2,299,228 | 10/1942 | Gray et al. | 317/230 |
| 2,871,425 | 1/1959 | Burnham | 317/230 |
| 2,871,426 | 1/1959 | Hilton | 317/230 |
| 3,244,946 | 4/1966 | Hilton | 317/238 |
| 3,093,883 | 6/1963 | Haring | 317/230 X |

*Primary Examiner*—James D. Kallam
*Attorney*—Wedneroth, Link & Ponack

[57] ABSTRACT

An electrical capacitor according to the invention comprises a pair of electrodes and an electrically conductive material in contact therewith, at least one of the electrodes being of titanium-zirconium alloy, the electrode having an anodic dielectric oxide film thereon. The Ti-Zr electrode preferably comprises 40–90 atomic percent of Ti and 10–60 percent of Zr, and has a sintered porous structure. In one form, the electrically conductive material is $MnO_2$; in another form, it is an aqueous solution of phosphoric acid, sulfuric acid, ammonium borate or potassium nitrite. A method of manufacture is also disclosed.

5 Claims, 2 Drawing Figures

PATENTED MAR 14 1972

3,649,880

KOREAKI NAKATA AND
YOSHIO IIDA, INVENTORS

By Wenderoth, Lind & Ponack, Attorneys

SOLID ELECTROLYTIC CAPACITOR HAVING A TITANIUM-ZIRCONIUM ALLOY ELECTRODE

This is a continuation of Ser. No. 704,057 filed Feb. 8, 1969, now abandoned.

This invention relates to an electrical capacitor comprising an alloy of titanium and zirconium and to a method for making the same and more particularly to a method for making an electrode having an anodic dielectric oxide film formed thereon.

Electrical capacitors, especially those of the electrolytic type, commonly employ metal electrodes on which a thin dielectric oxide coating has been formed. Heretofore, aluminum and tantalum have been commonly employed as capacitor electrode materials, and while each material has been found particularly useful under certain conditions, they have certain drawbacks. Aluminum is of lightweight and superior in the ductility which facilitates making a thin foil. In addition, aluminum foil is easily increased in the surface area thereof by surface etching, and is less expensive than tantalum. Therefore, aluminum in a foil form has been used widely for making electrolytic capacitors of the wet type. On the other hand, tantalum forms a dielectric oxide film thereon which is superior in electrical properties, especially in the leakage current at high voltages and easily makes a porous body compared to aluminum. However, tantalum is more expensive than aluminum and is restricted in application.

Titanium has also been considered heretofore for possible use as a capacitor electrode material in view of the high dielectric constant of its oxide and other good properties such as corrosion resistance and low density. However, it has been difficult to make a dielectric oxide film on the surface of titanium which is superior in leakage current at high voltages. Such drawback of titanium prevents a wide use thereof for an electrode adapted to an electrolytic capacitor, in spite of its high dielectric constant and good sinterability. Especially, a porous body of titanium is known to be inferior in respect of leakage current when formed into an electrolytic capacitor of the solid type.

Therefore, an object of the present invention is to provide titanium alloy electrode characterized by a dielectric oxide film formed thereon having a low leakage current at high voltages.

Another object of the invention is to provide a method for making titanium alloy electrode characterized by a dielectric oxide film formed thereon having a low leakage current at high voltages.

A further object of the invention is to provide a method for making titanium alloy suitable for an electrode material capable of forming a dielectric oxide film thereon having a low leakage current at high voltages.

A further object of the invention is to provide a titanium alloy electrolytic capacitor characterized by a low leakage current at high voltages.

A further object of the invention is to provide a titanium alloy electrolytic capacitor of the solid-type characterized by a large capacitance and a low leakage current at high voltages.

These and other objects of the invention will be evident upon consideration of the following detailed description taken together with accompanying drawings wherein.

Before proceeding with the detailed description of the novel electrode and its preparation method contemplated by the invention, a construction of an electrical capacitor comprising said electrode will be described with reference to FIGS. 1 and 2 of the drawings.

Figure 1:
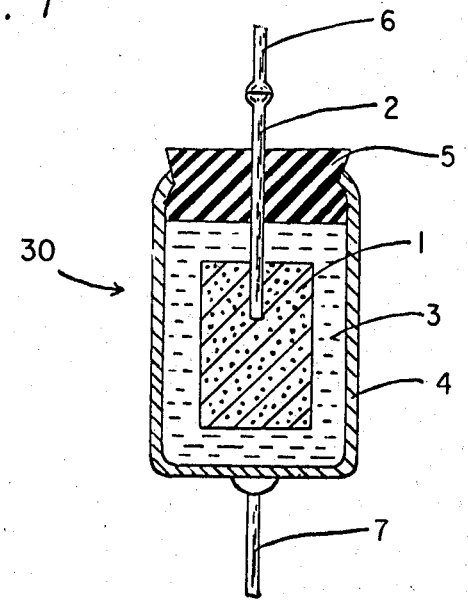
FIG. 1 is a cross sectional view of an electrolytic capacitor of the wet type in accordance with the invention.

Referring to FIG. 1, reference character 30 indicates, as a whole, a so-called wet electrolytic capacitor comprising a container 4 serving as the cathode and containing an electrolyte 3 in which an anode 1 is immersed. Said anode 1 consists of titanium alloy according to the invention and is formed into a desired form and is anodically oxidized in a manner illustrated in detail hereinafter. In this embodiment, said anode 1 is a sintered body of titanium alloy prepared in a manner described hereinafter. A film-forming lead wire 2 is embedded in said sintered body 1 of titanium alloy and extends to an insulating plug 5 made of any insulating and watertight material such as rubber or resin. Said film-forming lead wire may be made of the same alloy, or of niobium, titanium, tantalum or other film-forming metal. Electric leads 6 and 7 made of any solderable metal such as copper or iron are attached to said film-forming lead wire 2 and said container 4 in a per se well-known method such as a welding method.

Figure 2:
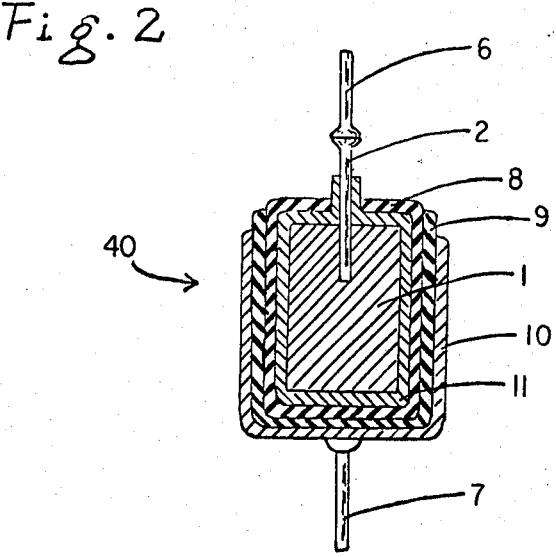
FIG. 2 is a cross sectional view of an electrolytic capacitor of the solid type in accordance with the invention.

Referring to FIG. 2, reference character 40 indicates, as a whole, a so-called electrolytic capacitor comprising a base electrode 1 contemplated by the invention. Said base electrode 1 may be of any form such as plate, wire or sintered form prepared in a manner illustrated hereinafter. Said sintered body 1 has a film-forming lead wire 2 embedded therein. Said sintered body and film-forming lead wire are coated with oxide film 11 by being anodically oxidized in a manner illustrated hereinafter. Said film-forming lead wire 2 is made of the same alloy, or of niobium, titanium, tantalum or other film-forming metal. Said oxide film 11 is coated with a layer 8 of a semiconductive material in per se well-known method. A carbon film layer 9 is integrated onto said layer 8 of semiconductive material by a per se conventional method such as a brushing method in which a carbon ink is applied by brushing. A silver paint 10 as counterelectrode is applied to said carbon film layer 9. Electric leads 6 and 7 made of any solderable metal such as copper and nickel are attached in per se conventional manner to said film-forming lead wire 2 and said counterelectrode 10, respectively.

It has been discovered according to the present invention that an alloy of titanium and zirconium can form a dielectric oxide film having a low leakage current at high voltages when anodically oxidized. Preferable and optimum compositions are as follows in accordance with the invention:

TABLE 1

| | Preferable Composition (Atomic%) | Optimum Composition (Atomic%) |
|---|---|---|
| Ti | 40 to 95 | 50 to 90 |
| Zr | 5 to 60 | 10 to 50 |

Said alloy of titanium and zirconium can be made in a per se conventional and suitable manner, for example, by a vacuum melting of a mixture in a given composition of by sintering a mixture of a given composition in a nonreactive atmosphere such as in argon or under a reduced pressure less than $10^{-4}$ mm. Hg at 800° to 1,400° C. similarly to conventional powder metallurgy technique.

Said alloy can be anodically oxidized in any aqueous solution per se well known in the art and is preferably anodically oxidized by employing a bath composition of aqueous solution consisting of 0.1 to 20 percent of phosphoric acid. Table 2 indicates the electrical properties of sintered bodies which are obtained by heating mixtures of titanium particles of about 15 microns and zirconium particles of about 4 microns in various compositions at 1,300° C. for 3 hours at a reduced pressure of $10^{-6}$ mm. Hg of air and furnace-cooled. So-produced sintered bodies have no porosity because relatively fine metal particles are employed, and are anodically oxidized in a bath composition of 10 percent by weight of phosphoric acid at a direct current voltage of 60 volts for 20 minutes. Capacitance and dissipation factor are measured at 120 c.p.s., employing a capacitance bridge. Leakage current is measured by immersing the anodically oxidized alloy into an aqueous solution of 10 percent by weight of phosphoric acid after application of a direct current voltage as large as two-thirds of the formation voltage for about 5 minutes. The term "leakage factor" is expressed by leakage current divided by the capacitance and the measuring voltage.

TABLE 2

| Composition (at. percent) | | Capacitance ($\mu$f./cm.$^2$) | D.F. (percent) | Leakage factor ($\mu$a./$\mu$f. v.) |
|---|---|---|---|---|
| Ti | Zr | | | |
| 100 | 0 | 0.28 | 18.6 | 2.6 |
| 97 | 3 | 0.21 | 6.5 | 1.0 |
| 95 | 5 | 0.19 | 4.6 | 0.24 |
| 92.5 | 7.5 | 0.19 | 5.5 | 0.40 |
| 90 | 10 | 0.19 | 5.3 | 0.24 |
| 85 | 15 | 0.19 | 4.8 | 0.15 |
| 80 | 20 | 0.19 | 3.8 | 0.094 |
| 60 | 40 | 0.19 | 1.8 | 0.067 |
| 40 | 60 | 0.20 | 1.8 | 0.25 |

A further discovery is that said alloy to be anodically oxidized is improved in leakage factor of the dielectric oxide film formed thereon when the alloy is heated in a nonreactive atmosphere such as argon and is cooled to room temperature of about 30° C. from a temperature of 500° to 1,000° C. at a rate higher than 50° C. per minute.

Table 3 shows the examples according to the invention. Alloy of titanium and zirconium in various compositions are prepared by heating mixtures of titanium particles and zirconium particles in various compositions in a way similar to that described above. So-produced alloys are in the form of a sintered body having no porosity and are heated at 1,000° C. at a reduced pressure of about $10^{-6}$ mm. Hg and cooled to room temperature of about 30° C. at a rate of 50° C. per minute. The cooled alloys are anodically oxidized in a bath composition comprising an aqueous solution of 10 percent of phosphoric acid so as to form dielectric oxide films thereon. The electrical properties of dielectric oxide films formed on the alloys are measured in a similar way to that mentioned above.

TABLE 3

| Composition (at. percent) | | Capacitance ($\mu$f./cm.$^2$) | D.F. (percent) | Leakage factor ($\mu$a./$\mu$f. v.) |
|---|---|---|---|---|
| Ti | Zr | | | |
| 100 | 0 | 0.25 | 14.6 | 2.1 |
| 97 | 3 | 0.20 | 7.7 | 1.0 |
| 95 | 5 | 0.24 | 10.8 | 0.49 |
| 92.5 | 7.5 | 0.20 | 3.8 | 0.39 |
| 90 | 10 | 0.18 | 1.4 | 0.058 |
| 85 | 15 | 0.17 | 1.5 | 0.062 |
| 80 | 20 | 0.20 | 1.6 | 0.016 |
| 70 | 30 | 0.19 | 1.4 | 0.046 |
| 60 | 40 | 0.17 | 1.4 | 0.029 |
| 50 | 50 | 0.18 | 1.1 | 0.025 |
| 40 | 60 | 0.19 | 1.8 | 0.048 |
| 25 | 75 | 0.20 | 1.9 | 0.15 |
| 100 | 0 | 0.16 | 2.2 | 1.6 |

It has been discovered according to the invention that the dielectric oxide films formed on the alloy of titanium and zirconium in compositions shown in Table 1 can form a so-called solid electrolytic capacitor superior in leakage factor when combined with a manganese dioxide layer integrated thereon. Other semiconductive materials such as $PbO_2$, NiO, $SnO_2$, $Cu_2O$ and CoO do not produce a superior solid electrolytic capacitor. Said manganese dioxide layer can be applied to said dielectric oxide film in a manner per se well known by a prior solid capacitor preparation technique. For example, an alloy according to the invention is anodically oxidized in a manner similar to that mentioned above and is immersed in a manganese nitrate solution and is heated at about 250° C. to provide manganese dioxide layer thereon.

Said manganese dioxide layer is coated with a carbon film layer by applying carbon ink containing colloidal carbon. Finally a silver paint as a counter electrode is applied to said carbon film layer in a per se conventional method.

Table 4 shows the electrical properties of solid electrolytic capacitors which have nonporous sintered bodies. The sintered bodies are made from titanium particles and zirconium particles in the aforesaid way. Additionally, the sintered bodies are heated in a vacuum and cooled to room temperature (about 30° C.) from a temperature of 1,000° C. at a rate of 50° C. per minute. The capacitance and the dissipation factor are measured by means of a capacitance bridge. THe leakage current is measured by applying a DC voltage of 20 volts across the two leads.

TABLE 4

| Composition (at. percent) | | Capacitance ($\mu$F./cm.$^2$) | D.F. (percent) | Leakage factor ($\mu$A./$\mu$F. V.) |
|---|---|---|---|---|
| Ti | Zr | | | |
| 100 | 0 | | | Break down. |
| 97 | 3 | | | Do. |
| 95 | 5 | 0.18 | 6.6 | 7.7. |
| 92.5 | 7.5 | 0.20 | 3.0 | 5.0. |
| 90 | 10 | 0.21 | 2.1 | 0.29. |
| 85 | 15 | 0.18 | 2.3 | 0.11. |
| 80 | 20 | 0.19 | 2.8 | 0.024. |
| 70 | 30 | 0.21 | 2.3 | 0.048. |
| 60 | 40 | 0.20 | 1.7 | 0.070. |
| 50 | 50 | 0.19 | 1.8 | 0.010. |
| 40 | 60 | 0.19 | 1.8 | 0.053. |

Table 4 indicates the capacitance, dissipation factor and leakage of so-produced solid electrolytic capacitors as a function of the composition of the titanium-zirconium alloy. It will thus be readily understood that the alloy of titanium and zirconium rapidly cooled produces a so-called solid electrolytic capacitor having a low leakage factor.

A porous sintered body of titanium-zirconium alloy can be made by sintering a compacted titanium-zirconium alloy powder or a compacted mixture of titanium particles and zirconium particles in finely divided powdered form at a temperature of 800° to 1,250° C. in a nonoxidizing atmosphere.

Various mixtures of titanium and zirconium particles in compositions listed in Table 5 are pressed at about 1,850 kg./cm.$^2$ into a tablet of 3 mm. diameter and 3 mm. height. The average grain sizes of used titanium particles and zirconium particles are about 60 and 4 microns, respectively. Each pressed tablet is provided with a film-forming lead wire made of niobium and is heated at 1,000° C. at a reduced pressure of $10^{-6}$ mm. Hg of air for 1 hour. The heated body is furnace-cooled to 1,000° C. and is rapidly cooled to about room temperature (30° C.) at a cooling rate of 50° C./minute by moving the heated body to an inner place of the furnace, which is cooled by a water pipe attached to the outer furnace. The sintered body has a porosity of about 30 percent and is anodically oxidized in a manner similar to that mentioned above.

The electrical properties of anodic oxide films on the porous sintered bodies mentioned above are listed in Table 5. The electrical properties are measured in a 10 percent phosphoric acid solution in a way similar to that described above.

TABLE 5

| Composition | | Capacitance ($\mu$f./cm.$^3$) | D.F., percent | Leakage factor ($\mu$a./$\mu$f. v.) | | |
|---|---|---|---|---|---|---|
| Wt. percent Zr | At. percent Zr | | | At 20 v. | At 20 v. | At 40 v. |
| 0 | 0 | 2,250 | 120 | 3.8 | | |
| 10 | 4.8 | 878 | 75 | 2.8 | | |
| 20 | 10.1 | 341 | 34 | 0.84 | 4.5 | |
| 30 | 16.2 | 152 | 12 | 0.060 | 0.26 | 0.38 |
| 40 | 23.2 | 142 | 14 | 0.010 | 0.033 | 0.032 |
| 50 | 30.8 | 126 | 32 | 0.010 | 0.026 | 0.055 |
| 60 | 40.3 | 127 | 36 | 0.016 | 0.055 | 0.18 |

The anodized porous sintered bodies are put into a container filled with an electrolytic solution consisting of aqueous phosphoric acid solution, aqueous sulfuric acid solution, aqueous ammonium borate solution or aqueous potassium solution, and sealed with a plug to prevent the electrolytic solution from leaking. Construction of a so-produced so-called wet electrolytic capacitor is shown in FIG. 1.

The dielectric oxide film formed on the surface of said porous sintered body is coated with a manganese dioxide layer by the aforesaid method in accordance with the invention. The sintered body having a dielectric oxide film and a manganese dioxide layer is fabricated into a solid electrolytic capacitor having a construction shown in FIG. 2.

So-produced solid electrolytic capacitors comprising a porous anode have a leakage factor of 0.009 to 0.1 $\mu$a./$\mu$f.v. at an applied voltage of 15 volts in the zirconium composition range of 10 to 60 atomic percent.

The above description has been made with reference to an anodic oxidation method by an aqueous solution. However, the novel effect of the alloy can be achieved when the alloy according to the invention is anodically oxidized in a fused salt of sodium nitrate, potassium nitrate, sodium nitrite or potassium nitrite. Among these, the preferable salt is sodium nitrate which is heated at a temperature of 310° to 400° C.

What is claimed is:

1. A solid electrolytic capacitor comprising:
   a. a sintered first electrode comprising an alloy consisting essentially of 40 to 80 atomic percent of titanium and 20 to 60 atomic percent of zirconium, said first electrode having a lead wire partly embedded therein,
   b. said lead wire and said first electrode having an anodically oxidized dielectric oxide layer of their respective materials thereon;
   c. a layer of manganese dioxide in contact with the said dielectric oxide layer of said lead wire and first electrode; and
   d. a second electrode means contacting the surface of the layer of manganese dioxide.

2. A solid electrolytic capacitor in accordance with claim 1 wherein the lead wire is made of a member selected from he group consisting of the same alloy as the first electrode, niobium, titanium and tantalum.

3. A solid electrolytic capacitor in accordance with claim 2 wherein said manganese dioxide layer is coated with a colloidal carbon film layer.

4. A solid electrolytic capacitor in accordance with claim 3 wherein said carbon layer is coated with a silver paint layer.

5. A solid electrolytic capacitor according to claim 4 wherein electric leads are attached to said embedded lead wire and said silver paint layer.

* * * * *